Nov. 22, 1938.  G. B. KARELITZ  2,137,689
GOVERNOR
Filed June 4, 1936   2 Sheets-Sheet 1
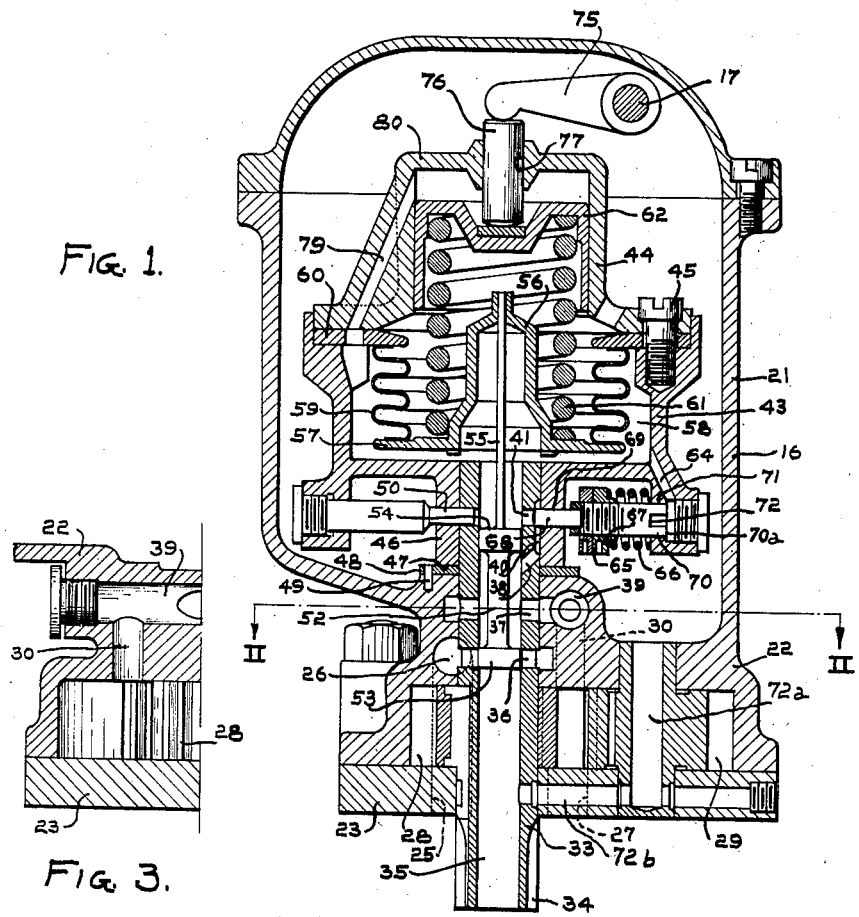
Fig. 1.
Fig. 3.
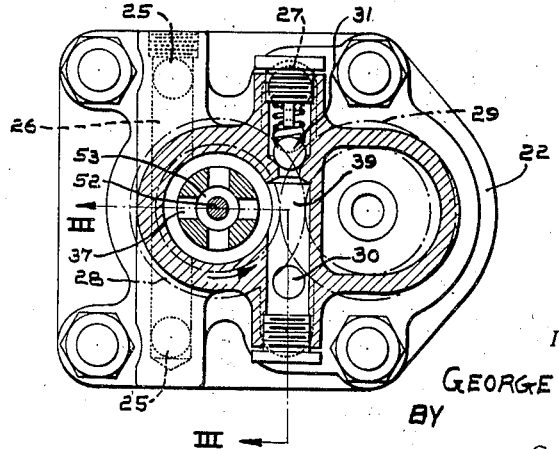
Fig. 2.
INVENTOR.
GEORGE B. KARELITZ
BY
  A. B. Reavis
    ATTORNEY.

Nov. 22, 1938.   G. B. KARELITZ   2,137,689
GOVERNOR
Filed June 4, 1936   2 Sheets-Sheet 2

INVENTOR.
GEORGE B. KARELITZ
BY
ATTORNEY.

Patented Nov. 22, 1938

2,137,689

UNITED STATES PATENT OFFICE 2,137,689

GOVERNOR

George B. Karelitz, New York, N. Y.

Application June 4, 1936, Serial No. 83,426

12 Claims. (Cl. 264—14)

My invention relates to mechanism for controlling the blade pitch of an airplane propeller to keep the engine speed constant.

There are in use at the present time mechanical centrifugal governors driven by the engine and operating through a relay to control the propeller blade pitch, the latter being adjusted so as to keep the engine speed constant; however, with this arrangement, the centrifugal force is directly applied to the relay and manual effort is directly exerted on the governor spring to effect speed changer adjustments. The conditions and environment of use necessitate a governor which shall not require much space. On the other hand, the weights and the spring should develop forces adequate to operate the relay. Aside from the matter of space, operation of the speed changer imposes a practical limit on the spring and, therefore, on the flyweights. In accordance with the present invention, the governing force for the relay is supplied by a motor device, which is intimately and dependently related to the governor, the latter functioning somewhat in the nature of a control device therefor, with the result that the centrifugal governor may be quite small compared to the controlling effort developed. Further, the motor device has hydraulic means associated with speed changer so that the manual effort required is greatly reduced. A further object of my invention is to provide equipment of this nature having these advantageous features of construction and operation.

A further object of my invention is to provide a motor device rotated by the engine and operating a relay to control the blade pitch, the motor device including an expansible and contractible chamber whose expansion is resisted by a load spring, together with a flyweight plunger carried by the motor device and controlling the admission and exhaust of fluid to the chamber, the centrifugal force of the weight being resisted by a spring and a differential pressure force derived from the chamber pressure cooperating with the centrifugal and spring forces to secure equilibrium.

A further object of my invention is to provide apparatus, as last indicated, with a piston abutment for the motor device load spring and subject to chamber pressure so that the effort required for speed changing is greatly reduced.

These and other objects are effected by my invention, as will be apparent from the following description and claims taken in connection with the accompanying drawings, forming a part of this application, in which:

Fig. 1 is a vertical sectional view of the governor;

Fig. 2 is a sectional view taken along the line II—II of Fig. 1;

Fig. 3 is a detail sectional view taken along the line III—III of Fig. 2;

Figure 4:
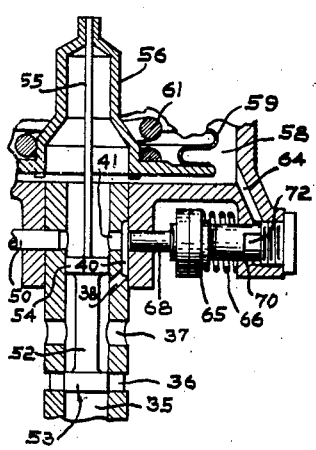
Figure 5:
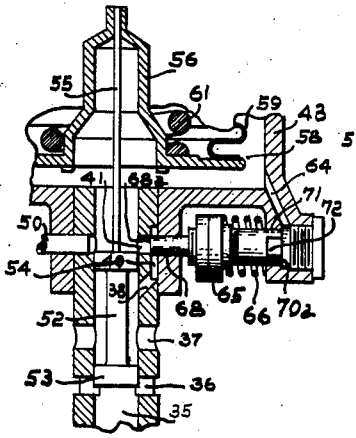
Figure 6:
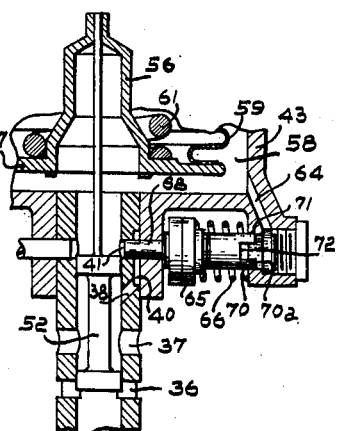
Figure 7:
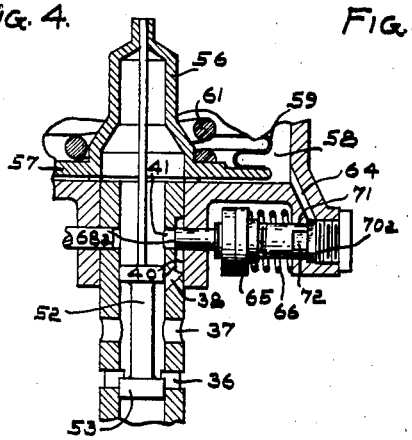
Figure 8:
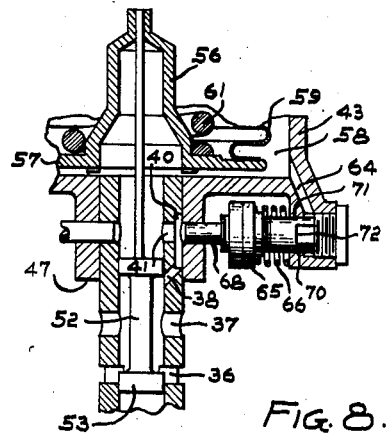
Figure 9:
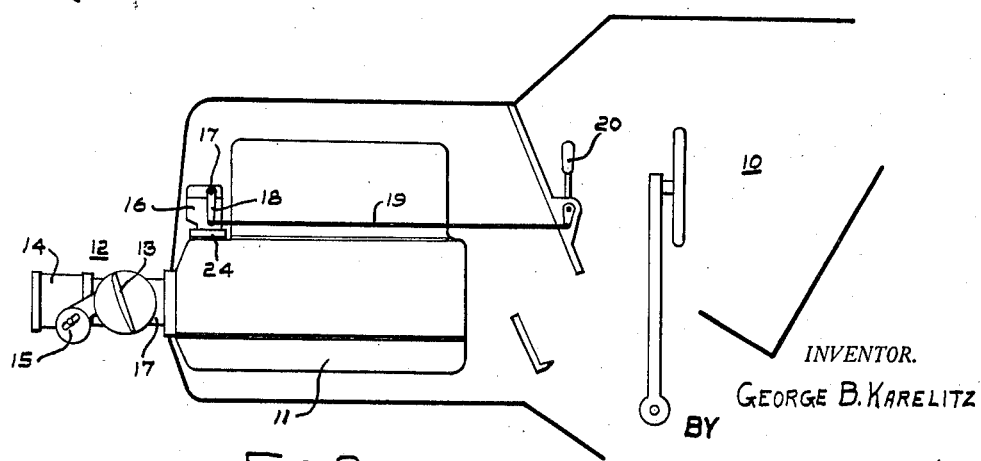

Figs. 4 to 8, inclusive, are diagrammatic sectional views showing different positions of the piston and centrifugal valves; and Fig. 9 shows my improvement as applied to an airplane.

Referring first to Fig. 9, there is shown diagrammatically the cockpit 10 of an airplane having an engine 11 driving a propeller, at 12, having blades 13, which may be feathered or turned about their longitudinal axes by means of a fluid-pressure operated device or cylinder 14 turning the blades through mechanisms 15. Oil under pressure is supplied, as is customary, from the governor or control device 16 through the hollow drive shaft (not shown). This arrangement is already known in the art and further description is unnecessary, it being merely required to remember that increase in pressure turns the blades in one direction, for example, to decrease the blade pitch, and decrease in pressure results in turning thereof in the other direction, for example, to increase the blade pitch.

My invention is concerned with improved governor mechanism 16 for furnishing oil under pressure to adjust the blades so as to maintain the engine speed, the mechanism 16 having a speed changer shaft 17 provided with a lever 18 connected by a link 19 to a hand lever 20 in the cockpit. With this arrangement, if the engine speed should decrease because of the blade pitch being too large, then the governor furnishes increased oil pressure to reduce the blade pitch until engine speed is restored to normal. If the engine should speed up because of the blade pitch being too small, then reduced pressure will be impressed on the operating device 14 and the blade pitch will be increased until the engine speed is reduced to normal. Thus the control device 16 operates to adjust the propeller to keep the engine speed constant; and, to change the speed of the engine, if it is necessary to operate the lever 20 to effect a speed changer adjustment.

The control mechanism 16 includes three essential parts, namely, the relay for controlling the pressure for the pressure-responsive blade pitch operating mechanism, a motor device for operating the relay and a centrifugal governor forming a part of the motor device. The relay includes an engine-driven sleeve or spindle whose upper end is connected to the motor device arranged in a suitable housing.

Referring first to the motor device and governor housing, this is shown at 21, and it includes a base portion 22 and a base plate 23 arranged to fit a standard face plate 24 provided on engines of the present type, such face plate being provided with pressure and supply ports; and, as shown in Fig. 2, the base 22 is provided with a pair of vertical pressure ports 25 connected by a cross passage 26 so that one or the other of said ports 25 may be connected by any suitable means to the operating cylinder 14 by a suitably registering port provided in the face plate. The base 22 is further provided with a supply port 27, also in registry with a port in the face plate, for supplying oil under positive pressure to the inlet of the gear pump including gears 28 and 29 and it is discharged from the pump through the passage 30 having a pressure relief valve 31, which functions to limit the outlet passage pressure, the valve opening in the usual way to by-pass oil back to the inlet in case the pressure tends to exceed the value determined by the valve setting.

The control mechanism 16 includes a hollow spindle or relay sleeve 33 having a splined end 34 for connection to the usual driving device operated by the engine.

The spindle is made hollow to provide the interior cylindrical bore 35 having operating cylinder lower ports 36, intermediate pressure supply ports 37, and an upper inlet port 38. The ports 36 are connected to the cross passage 26 for the ports 25 and the ports 37 communicate with the chamber 39 of the pump outlet passage. The port 38 is connected to the recess 40, communicating with a cylindrical port 41 opening into the upper end of the bore 35, the ports 38 and 41, and the connecting recess 40 therefor, and portions of the bore 35 comprising an inlet passage for the bellows chamber hereinafter referred to.

The upper end of the hollow spindle 33 has connected thereto the hollow body 43 of the motor device, the body being provided with a cap 44 attached thereby by screws 45. The body 43 has a cuff 46. The cuff 46 has a close or drive fit with respect to the upper end of the spindle to cover the recess 40, and the lower end 47 of the cuff provides a thrust face bearing on the hardened steel ring 48 held against rotation by the pin 49. The telescoping upper end of the spindle and the cuff are held together by the pin 50.

A piston or relay valve 52 in the bore 35 has a lower piston portion 53 arranged, when in neutral position, to cover the operating cylinder ports 36, downward movement of the piston portion placing such ports in communication with the pressure ports 37 and upward movement of the piston portion, placing them in communication with the drain space including the lower portion of the bore below the piston portion 53. The piston valve also has a piston portion 54 separating the ports 38 and 41 and a stem 55 joined at its upper end to the hollow stem 56 of the abutment plate 57 fixed to the lower end of a bellows 59, whose upper end is secured to a flange ring 60 clamped in place between the body 43 and the cap 44, the bellows and the abutment plate cooperating with the hollow interior of the body to provide an expansible and contractible chamber 58.

A load spring 61, arranged externally of the chamber 58, has its lower end abutting against the abutment plate 57 and its upper end engaged by the inverted cap abutment 62.

Fluid under pressure is supplied through the ports 38 and 41 and their connecting recess 40 and contiguous portions of the bore 35 to act on the lower abutment or piston face of the abutment 57 to raise the latter against the force of the load spring 61, thereby raising the piston valve to lower the pressure applied to the operating cylinder. If the pressure in the chamber 58 is relieved by the passage 64, then the contrary operation takes place, the piston valve being moved down by the load spring to place the operating cylinder ports 36 in communication with the pressure ports 37 to increase the applied pressure.

If the port 41 is opened and the passage 64 is closed, the pressure of the bellows chamber 58 increases; if the port and passage are closed, there is no change in such pressure; and, if the port is closed and the passage is opened, the bellows chamber pressure is reduced. Control of the port and the passage is effected by a radial plunger 65, movable outwardly under influence of centrifugal force against the spring 66, whose force may be varied by adjustment of the nuts 67. The inner end portion 68 of the plunger fits a guide opening 69 in the cuff 46 and is alined with the port 41, and the inner portion is smaller than the outer end portion 70, which fits a cylindrical opening 71 in the body 43 and with which the passage 64 communicates.

The outer end portion 70 is recessed at 72 so that, with retraction of the plunger, fluid can escape from the chamber 58 through the passage 64 and the recesses 72, the escaping liquid passing through the axial passage 72a and the cross passage 72b to the drain space including the lower portion of the bore 35 of the sleeve 33.

The plunger 65 is of such length and design that, when in neutral position, the inner end just closes the port 41 and the recess 72 is just closed. Slight outward movement results in opening of the port 41 to increase the bellows chamber pressure and slight inward movement thereof from neutral opens the recess 72 to lower such pressure. Assuming the ports to be in the positional equilibrium shown in Fig. 1, then centrifugal force of the plunger 65 is in balance with the force of the spring 66 and the differential pressure acting on the smaller and larger end faces 68a and 70a of the smaller and larger plunger ports 69 and 70, the ports 41 and 72 being sealed, and the piston valve is in neutral with the piston portion 53 closing the operating cylinder ports 36 from the high-pressure supply and the drain.

Now, assume an increase in engine speed to occur. The flyweight plunger 65 moves out, Fig. 4, thereby opening the port 41 to open the inlet passage to permit the passage of high pressure oil from the high pressure ports 37 to the bellows chamber 58 to compress the bellows 59 against the force of the spring 61 raising the piston portion 53 to open the operating cylinder ports 36 to drain, whereupon pressure impressed on the operating cylinder is reduced and the latter operates to increase the blade pitch of the propeller, and thereby increase the resisting or load torque imposed on the engine, causing the latter to decrease in speed. With slowing down of the engine, the plunger 65 moves inward under influence of the spring and the differential pressure acting on the plunger piston areas 68a and 70a, the plunger closing the inlet port 41 and opening the discharge port 72 (Figs. 5 and 6), whereupon the pressure in the bellows chamber is reduced and the piston valve is moved down to close the operating cylinder ports 36. The reduced pressure in the bellows chamber results in reduction of the inwardly-acting differential pressure force on the plunger, whereby the sum of such force and the spring force is reduced and centrifugal force causes outward movement of the plunger 65.

Equilibrium is again established when both the governor flyweight or plunger 65 and the piston valve 52 are returned to neutral position, when the engine speed is the same as before the disturbance. Hunting of the apparatus is effectively resisted by the inherent friction of moving parts and by the bellows pressure acting differentially on the plunger 65.

Assuming the mechanism to be in positional equilibrium and that the engine slows down because of increase in load, centrifugal force of the plunger 65 is reduced and the latter moves inward due to the spring 66, opening the discharge port 72 and reducing the bellows chamber pressure. The load spring 61 thereupon moves the piston valve 52 down to place the operating cylinder ports 36 in communication with the pressure ports 37 and the resulting increased pressure causes the operating cylinder to reduce the angle of attack of the propeller blades and thereby to reduce the resisting torque of the load, whereupon the engine speeds up and the increase in centrifugal force causes the plunger 65 to move out, closing the port 72 and cracking the port 41 to admit high pressure oil to the bellows chamber, causing the bellows to contract and raise the piston 52 to neutral. Equilibrium will again be re-established when both the plunger 65 and the pilot valve 52 are in neutral at which time the engine speed will be back to normal. Here again the forces already referred to are effective to minimize hunting.

Thus, it will be seen that an increase in resisting torque of the load causes the engine to slow down, whereupon the governor driven by the engine operates to reduce the resisting torque so as to restore the engine speed to its normal value. On the other hand, should the resisting torque decrease, the engine speeds up and operates the governor to increase the resisting torque to restore the engine speed to normal.

From the apparatus so far described, it will be seen that the engine-driven relay sleeve drives both the pressure-developing gear pump and the motor device, the motor device including means providing an expansible and contractible pressure chamber 58 whose expansion is resisted by the load spring 61 and also including valve means for controlling the supply and exhaust of pressure fluid to the chamber, the valve means constituting an essential part of the governor in that the governor flyweight has piston valve elements at its ends, the remaining features of the governor comprising the spring and differential piston faces at the ends of the plunger so that a differential pressure force derived from chamber pressure may be continuouusly applied to the plunger in the same direction as the spring force.

Referring now to the speed changer operated by the lever 20, this embodies a lever 75 in the housing 21 and connected to the shaft 17, the lever bearing against a plunger 76 mounted in the guide 77 provided in the cover 44 and the lower end of the plunger bearing against the cup piston 62 forming the abutment for the upper end of the load spring 61. If the hand lever 20 is operated to cause the lever 75 to move down, the spring force is increased and the required bellows pressure for equilibrium is increased. On the other hand, if the lever is moved up, the spring force and the equilibrium pressure are reduced.

An increase in spring force causes an increase in engine speed and vice versa. With the parts in positional equilibrium, if the lever 75 is moved down, this moves the relay plunger 52 down, as shown in Fig. 7, placing the operating cylinder ports 36 in communication with the pressure ports 37 to increase the pressure applied to the operating cylinder, causing the latter to decrease the pitch of the propeller blades, whereupon the engine speeds up. The governor plunger 65 then moves out, increasing the bellows chamber pressure to raise the piston valve, as shown in Fig. 8. The engine speed increases until the bellows pressure is sufficient to raise the piston valve 52 to neutral position. This pressure is, however, applied to the differential piston faces 70a and 68a of the plunger flyweight 65, and positional equilibrium is established at a speed higher than originally, the increased centrifugal force of the plunger being neutralized by the force of the spring and the increased differential force of the bellows chamber pressure applied to the plunger. If the lever 75 is raised, the contrary operations occur, the spring force being reduced, the piston valve rising and reducing the operating cylinder pressure to increase the propeller blade pitch and consequently the resisting torque thereof, whereupon the engine slows down and the flyweight plunger 65 moves in to reduce the bellows chamber pressure, the parts coming to positional equilibrium at a lower engine speed because of the lower bellows pressure required to neutralize the piston valve and the decreased centrifugal force of the plunger required to balance the spring and the decreased pressure differential.

To reduce the effort required to operate the speed changer lever, the force of the load spring 61 is largely counteracted by the bellows chamber pressure, the cover 44 having a passage 79 for conducting oil to the space 80 between the cover and the piston type spring abutment 62.

The parts are so constructed and arranged that good running balance is secured. For example, the pin 50 is designed to be in substantial balance with the plunger flyweight 65.

From the foregoing, it will be apparent that I have provided control mechanism for automatically changing the propeller blade pitch to keep the engine speed constant. The mechanism comprises a motor device for operating a relay to control the pressure applied for blade pitch adjustment, the motor device being rotated by the engine and having an expansible and contractible chamber, whose expansion is resisted by a load spring. A flyweight plunger carried by the motor device controls the admission and exhaust of fluid under pressure to the expansible chamber, outward movement of the plunger under the influence of centrifugal force being opposed by a spring. Also, the ends of the plunger provide piston faces of different areas continuously subject to chamber pressure so that a differential pressure force may be applied to the plunger in the same direction as the spring. As the work of control is done by a motor device, it will be seen that a very large controlling force is available, while, at the same time, using a very small governor, which really functions in the nature of a valve for the motor device, this arrangement being possible because the fluid pressure of the motor device is used directly to provide a controlling force for the governor. If the engine changes in speed, the governor immediately brings about a change in fluid pressure in the motor device, and the latter results in actuation of the relay to change the blade pitch, whereupon the engine changes in speed in the other direction, the latter effect being immediately impressed on the governor. If the restoration should go too far, then the device accomplishes the reverse effect, for the governor is seeking an equilibrium cut-off position where the centrifugal force is in balance with the governor spring force and the differential pressure force, and the blade pitch will be changed until the engine can rotate at its normal speed, at which time the governor will be in equilibrium. Furthermore, the effort required for speed changer adjustment is greatly reduced in that the greater part of the force overcoming the load spring force is furnished by fluid pressure supplied from the expansible and contractible chamber, the manual means determining the position of the load spring abutment and providing whatever additional force may be required for moving it.

While I prefer to have the governor plunger move out under the influence of centrifugal force to admit fluid under pressure to the motor device to operate the latter to bring about decrease in engine speed and to move inward under the influence of the spring force and the differential pressure force to effect increase in speed, so far as the invention is concerned, the motor device might have other relations of the load spring and fluid pressures to effect its operation responsively to prime mover speed for the accomplishment of the purpose indicated. Also, while the differential pressure force preferably acts in the same direction as the governor spring force, the relation of importance is that the plunger moves due to a condition of unbalance of these forces and comes to a cut-off position with these forces in equilibrium. My invention contemplates, therefore, any arrangement or relation of the forces involved in the motor device and in the governor which brings about modification of the driven load in such a way as to keep the engine or prime mover speed constant.

While I have shown my invention in but one form, it will be obvious to those skilled in the art that it is not so limited, but is susceptible of various changes and modifications without departing from the spirit thereof, and I desire, therefore, that only such limitations shall be placed thereupon as are imposed by the prior art or as are specifically set forth in the appended claims.

What I claim is:

1. In an apparatus for governing the speed of an engine subject to variable loads, in combination, means providing a source of fluid under pressure, a relay including a movable element normally occupying a neutral position and movable, in one or another direction, to utilize the pressure fluid to effect a control force, a motor device connected to the movable element of the relay and including means providing an expansible and contractible chamber, a load spring opposing expansion of the chamber, an inlet passage for supplying fluid from said source to the chamber, and an outlet passage for said chamber; and a valve aggregate responsive to speed of the engine for controlling said passages; said valve aggregate including valve means interrupting both passages when the engine is running at normal speed, opening one passage and maintaining the other passage closed with decrease in engine speed and opening the last-named passage and maintaining the first passage closed with increase in engine speed; and said valve aggregate including a centrifugal weight element movable in response to speed of the engine and connected to the valve means, a spring for opposing the centrifugal force of the weight element, and differential piston means continuously subject to expansible chamber pressure so as to apply a differential pressure force to the element in the same direction as the spring.

2. In an apparatus for governing the speed of an engine subject to variable loads, in combination, means providing a source of fluid under pressure, a relay including a movable element normally occupying a neutral position and movable, in one or another direction, to utilize the pressure fluid to effect a control force, a motor device operatively connected to the movable element of the relay and including means providing an expansible and contractible chamber, a load spring opposing expansion of the chamber, an inlet passage for supplying fluid from said source to the chamber, and an outlet passage for said chamber; and a valve aggregate responsive to speed of the engine for controlling said passages; said valve aggregate including valve means interrupting both passages when the engine is running at normal speed, opening one passage and maintaining the other passage closed with decrease in engine speed and opening the last-named passage and maintaining the first passage closed with increase in engine speed; and said valve aggregate including a centrifugal weight element movable in response to speed of the engine and connected to the valve means, a spring for opposing the centrifugal force of the weight element, and differential piston means continuously subject to expansible chamber pressure so as to apply a differential pressure force to the element in the same direction as the spring.

3. In an apparatus for governing the speed of an engine subject to variable loads, in combination, means providing a source of fluid under pressure, a relay including a movable element normally occupying a neutral position and movable, in one or another direction, to utilize the pressure fluid to effect a control force, a motor device operatively connected to the movable element of the relay and including means providing an expansible and contractible chamber, a load spring opposing expansion of the chamber, an inlet passage for supplying fluid from said source to the chamber, and an outlet passage for said chamber; and a radially movable plunger having its inner end arranged to open and close the one passage and having its outer end arranged to open and close the other passage; said plunger closing both passages at normal engine speed, opening said one passage with decrease in speed, and opening the said other passage with increase in speed, a spring for opposing outward radial movement of the plunger; and piston faces provided at the ends of the plunger and subject continuously to chamber pressure and the area of one face being greater than that of the inner.

4. In an apparatus for governing the speed of an engine subject to variable loads, in combination, means providing a source of fluid under pressure, a relay including a movable element normally occupying a neutral position and movable, in one or another direction, to utilize the pressure fluid to effect a control force, a motor device connected to the movable element of the relay and including means providing an expansible and contractible chamber, a load spring opposing expansion of the chamber, an inlet passage for supplying fluid from said source to the chamber, and an outlet passage for said chamber; a valve aggregate responsive to speed of the engine for controlling said passages; said valve aggregate including valve means interrupting both passages when the engine is running at normal speed, opening the inlet passage and maintaining the outlet passage closed with decrease in engine speed and opening the outlet passage and maintaining the inlet passage closed with increase in engine speed and said valve aggregate including a centrifugal weight element movable in response to speed of the engine and connected to the valve means; a spring for opposing the centrifugal force of the weight element; differential piston means continuously subject to expansible chamber pressure so as to apply a differential pressure force to the element in the same direction as the spring; and speed changing means including a movable abutment engaging the load spring and means for adjusting the abutment.

5. In an apparatus for governing the speed of an engine subject to variable loads, in combination, means providing a source of fluid under pressure, a relay including a movable element normally occupying a neutral position and movable, in one or another direction, to utilize the pressure fluid to effect a control force, a motor device connected to the movable element of the relay and including means providing an expansible and contractible chamber, a load spring opposing expansion of the chamber, an inlet passage for supplying fluid from said source to the chamber, and an outlet passage for said chamber; a valve aggregate responsive to speed of the engine for controlling said passages; said valve aggregate including valve means interrupting both passages when the engine is running at normal speed, opening the inlet passage and maintaining the outlet passage closed with decrease in engine speed and opening the outlet passage and maintaining the inlet passage closed with increase in engine speed and said valve aggregate including a centrifugal weight element movable in response to speed of the engine and connected to the valve means; a spring for opposing the centrifugal force of the weight element; differential piston means continuously subject to expansible chamber pressure so as to apply a differential pressure force to the element in the same direction as the spring; and speed-changing means including a movable abutment engaging the load spring and means providing for utilization of fluid pressure under chamber pressure to adjust the abutment.

6. In an apparatus for governing the speed of an engine subject to variable loads, in combination, means providing a source of fluid under pressure, a relay including a movable element normally occupying a neutral position and movable, in one or another direction, to utilize the pressure fluid to effect a control force, a motor device connected to the movable element of the relay and including means providing an expansible and contractible chamber, a load spring opposing expansion of the chamber, an inlet passage for supplying fluid from said source to the chamber, and an outlet passage for said chamber; a valve aggregate responsive to speed of the engine for controlling said passages; said valve aggregate including valve means interrupting both passages when the engine is running at normal speed, opening the inlet passage and maintaining the outlet passage closed with decrease in engine speed and opening the outlet passage and maintaining the inlet passage closed with increase in engine speed and said valve aggregate including a centrifugal weight element movable in response to speed of the engine and connected to the valve means; a spring for opposing the centrifugal force of the weight element; differential piston means continuously subject to expansible chamber pressure so as to apply a differential pressure force to the element in the same direction as the spring; and speed-changing means including a piston abutment engaging the load spring, said motor device including a second expansible and contractible chamber closed by said piston abutment, a passage formed in said motor device and affording communication between the chambers, and manually-operated means engaging the piston abutment for controlling the position and for supplying whatever extra force may be required to effect its movement.

7. In an apparatus for governing the speed of an engine subject to variable loads, in combination, means providing a source of fluid under pressure; a drain space into which said fluid may be discharged, a relay including a hollow stem driven by the engine and a piston valve therein, said stem having a pressure port in communication with the drain space, a second port arranged below the pressure port for discharge of the pressure fluid externally of the apparatus, a pair of spaced ports arranged above the pressure port and connected by a passage formed in the stem, the uppermost port of said pair being radial; said piston valve including spaced lower and upper piston portions, the lower piston portion normally covering said second port and movable to place the latter either in communication with the pressure port or with the lower drain portion of the stem and the upper piston portion separating the ports of said pair; a hollow body connected to the upper end of the stem; a bellows within the body and having one end movable and cooperating with body interior to provide an expansible and contractible chamber; the movable end of the bellows being connected to the piston valve; the upper end of said stem and the upper pair of ports and their connecting passage providing an inlet passage for the chamber; said body having an outlet passage for said chamber; a radial plunger carried by the body and having its inner end formed to fit the uppermost radial port to open and close the latter and having its outer end arranged to open and close the outlet passage; said plunger, at normal engine speed, having its inner end covering the radial port and having its outer end interrupting the outlet passage and movable outwardly, due to increase in engine speed, to uncover the radial port, and, inwardly, due to decrease in engine speed, to open said outlet passage; and a spring arranged so that its force opposes the centrifugal force of the plunger; said plunger having inner and outer piston faces continuously subject to chamber pressure and the other face being of larger area so that a differential pressure force is applied to the plunger and acting in the same direction as the spring.

8. In an apparatus for governing the speed of an engine subject to variable loads, in combination, a source of fluid under pressure; means providing a drain space; a relay affording discharge of the pressure fluid externally of the apparatus or into the drain space and providing also for interrupting entirely said discharge of the pressure fluid; said relay including a sleeve driven by the engine and a piston valve in the sleeve and said sleeve having a lower port leading externally of the apparatus and a port disposed thereabove and communicating with the pressure source, the interior of said sleeve below the lower port constituting a part of said drain space; said piston valve having a piston portion normally covering said lower port and movable to place the latter either in communication with the pressure port or the drain space; a motor device including a hollow body connected to the upper end of the sleeve and including a bellows cooperating with the interior of the body to provide an expansible and contractible chamber, a load spring cooperating with the bellows and resisting expansion of the chamber, an inlet passage including a radial port formed in the sleeve for supplying fluid under pressure to the chamber, an outlet passage formed in the body for discharging fluid from the chamber; means for transmitting movement of the bellows to the pilot valve; a plunger carried by the body and guided for radial movement by the latter; said plunger having its inner end cooperating with said radial port to open and close the inlet passage and having its outer end cooperating with the outlet passage to open and close the latter and the plunger having such length that it may close both passages or open either; a spring for resisting outward movement of the plunger due to centrifugal force; and means utilizing chamber pressure to apply a differential pressure force to the plunger in the same direction as the spring and including piston faces at the ends of plunger, the outer face being larger than the inner, and portions of the inlet and outlet passages being constructed and arranged so that chamber pressure is continuously applied to such faces.

9. In an apparatus for governing the speed of an engine subject to variable loads, in combination, a source of fluid under pressure; means providing a drain space; a relay affording discharge of the pressure fluid externally of the apparatus or into the drain space and providing also for interrupting entirely said discharge of the pressure fluid; said relay including a sleeve driven by the engine and a piston valve in the sleeve and said sleeve having a lower port leading externally of the apparatus and a port disposed thereabove and communicating with the pressure source, the interior of said sleeve below the lower port constituting a part of said drain space; said piston valve having a piston portion normally covering said lower port and movable to place the latter either in communication with the pressure port or the drain space; a motor device including a hollow body connected to the upper end of the sleeve and including a bellows cooperating with the interior of the body to provide an expansible and contractible chamber, a load spring cooperating with the bellows and resisting expansion of the chamber, an inlet passage including a radial port formed in the sleeve for supplying fluid under pressure to the chamber, an outlet passage formed in the body for discharging fluid from the chamber; means for transmitting movement of the bellows to the pilot valve; a plunger carried by the body and guided for radial movement by the latter; said plunger having its inner end cooperating with said radial port to open and close the inlet passage and having its outer end cooperating with the outlet passage to open and close the latter and the plunger having such length that it may close both passages or open either; a spring for resisting outward movement of the plunger due to centrifugal force; means utilizing chamber pressure to apply a differential pressure force to the plunger in the same direction as the spring and including piston faces at the ends of plunger, the outer face being larger than the inner, and portions of the inlet and outlet passages being constructed and arranged so that chamber pressure is continuously applied to such faces; and speed-changer mechanism including a movable abutment for the end of the spring opposite to that engaging the bellows and means for adjusting the position of the abutment.

10. In an apparatus for governing the speed of an engine subject to variable loads, in combination, a source of fluid under pressure; means providing a drain space; a relay affording discharge of the pressure fluid externally of the apparatus or into the drain space and providing also for interrupting entirely said discharge of the pressure fluid; said relay including a sleeve driven by the engine and a piston valve in the sleeve and said sleeve having a lower port leading externally of the apparatus and a port disposed thereabove and communicating with the pressure source, the interior of said sleeve below the lower port constituting a part of said drain space; said piston valve having a piston portion normally covering said lower port and movable to place the latter either in communication with the pressure port or the drain space; a motor device including a hollow body connected to the upper end of the sleeve and including a bellows cooperating with the interior of the body to provide an expansible and contractible chamber, a load spring cooperating with the bellows and resisting expansion of the chamber, an inlet passage including a radial port formed in the sleeve for supplying fluid under pressure to the chamber, an outlet passage formed in the body for discharging fluid from the chamber; means for transmitting movement of the bellows to the pilot valve; a plunger carried by the body and guided for radial movement by the latter; said plunger having its inner end cooperating with said radial port to open and close the inlet passage and having its outer end cooperating with the outlet passage to open and close the latter and the plunger having such length that it may close both passages or open either; a spring for resisting outward movement of the plunger due to centrifugal force; means utilizing chamber pressure to apply a differential pressure force to the plunger in the same direction as the spring and including piston faces at the ends of plunger, the outer face being larger than the inner, and portions of the inlet and outlet passages being constructed and arranged so that chamber pressure is continuously applied to such faces; and speed-changer mechanism including a movable abutment engaging the load spring, said abutment being of smaller area than the bellows, and means for adjusting the position of the abutment including means for applying fluid under chamber pressure thereto.

11. In an apparatus for governing the speed of an engine subject to variable loads, in combination, a source of fluid under pressure; means providing a drain space; a relay affording discharge of the pressure fluid externally of the apparatus or into the drain space and providing also for interrupting entirely said discharge of the pressure fluid; said relay including a sleeve driven by the engine and a piston valve in the sleeve and said sleeve having a lower port leading externally of the apparatus and a port disposed thereabove and communicating with the pressure source, the interior of said sleeve below the lower port constituting a part of said drain space; said piston valve having a piston portion normally covering said lower port and movable to place the latter either in communication with the pressure port or the drain space; a motor device including a hollow body connected to the upper end of the sleeve and including a bellows cooperating with the interior of the body to provide an expansible and contractible chamber, a load spring cooperating with the bellows and resisting expansion of the chamber, an inlet passage including a radial port formed in the sleeve for supplying fluid under pressure to the chamber, an outlet passage formed in the body for discharging fluid from the chamber; means for transmitting movement of the bellows to the pilot valve; a plunger carried by the body and guided for radial movement by the latter; said plunger having its inner end cooperating with said radial port to open and close the inlet passage and having its outer end cooperating with the outlet passage to open and close the latter and the plunger having such length that it may close both passages or open either; a spring for resisting outward movement of the plunger due to centrifugal force, means utilizing chamber pressure to apply a differential pressure force to the plunger in the same direction as the spring and including piston faces at the ends of plunger, the outer face being larger than the inner, and portions of the inlet and outlet passages being constructed and arranged so that chamber pressure is continuously applied to such faces; and speed-changer mechanism including a movable piston abutment of smaller area than that of the bellows engaging the load spring, said hollow body having a second expansible and contractible chamber closed by the piston abutment and provided with a passage affording communication between both chambers, and manually-operated means engaging the piston abutment to position the latter and supply whatever additional force is required to effect its movement.

12. In an apparatus for governing the speed of a prime mover driving a load whose resisting torque may be varied by pressure-responsive means, in combination, a governor mechanism for supplying fluid under variable pressure to effect a control force, said governor mechanism including a chamber; a movable abutment in the chamber and defining an expansible and contractible fluid-pressure chamber; biasing means exerting its force on the abutment in opposition to expansion of the expansible chamber; a valve chamber having a port connected to the pressure-responsive means, a drain passage, and a pressure supply port; means for supplying fluid under pressure to the supply port; a valve in the valve chamber and connected to the abutment for placing the pressure-responsive means port in communication with the pressure supply port or with the drain or for interrupting such communication; a passage for supplying fluid from the supply means to said fluid-pressure chamber to act on the abutment in opposition to the biasing means; an exhaust passage for said fluid-pressure chamber; and speed-responsive means operated by the prime mover and effective to close both of said passages at normal prime mover speed and effective to open one passage with a decrease in speed and to open the other passage with an increase in speed in order to effect movement of the abutment and the valve to alter the pressure supplied to the pressure responsive means to change the resisting torque of the load in order to restore the prime mover to normal speed; said speed-responsive means including a flyweight element, a spring opposing centrifugal force of the flyweight element, and means for deriving a differential pressure force from said chamber pressure and for applying it to the flyweight element in the same direction as the spring.

GEORGE B. KARELITZ.